US009817725B2

(12) United States Patent
Tsai et al.

(10) Patent No.: US 9,817,725 B2
(45) Date of Patent: Nov. 14, 2017

(54) FLASH MEMORY CONTROLLER, DATA STORAGE DEVICE, AND FLASH MEMORY CONTROL METHOD WITH VOLATILE STORAGE RESTORATION

(71) Applicant: VIA TECHNOLOGIES, INC., New Taipei (TW)

(72) Inventors: Chin-Yin Tsai, New Taipei (TW); Yi-Lin Lai, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 232 days.

(21) Appl. No.: 14/514,733

(22) Filed: Oct. 15, 2014

(65) Prior Publication Data
US 2015/0309886 A1 Oct. 29, 2015

(30) Foreign Application Priority Data

Apr. 23, 2014 (TW) .............................. 103114630 A

(51) Int. Cl.
*G06F 11/14* (2006.01)
*G06F 12/02* (2006.01)

(52) U.S. Cl.
CPC ...... *G06F 11/1469* (2013.01); *G06F 11/1451* (2013.01); *G06F 12/0246* (2013.01);
(Continued)

(58) Field of Classification Search
None
See application file for complete search history.

(56) References Cited

U.S. PATENT DOCUMENTS 6,708,231 B1 * 3/2004 Kitagawa .................. G06F 8/65
710/10
8,316,257 B2 * 11/2012 Royer .................. G06F 11/1064
711/103
(Continued)

FOREIGN PATENT DOCUMENTS

CN 102203740 9/2011
TW 201122816 7/2011
(Continued)

OTHER PUBLICATIONS

T. Miwa, J. Yamada, et al., "NV-SRAM: A Nonvolatile SRAM with Backup Ferroelectric Capacitors", Mar. 2001, IEEE JSSC, vol. 36, No. 3, pp. 522-527.*
(Continued)

*Primary Examiner* — Matt Kim
*Assistant Examiner* — Paul Contino
(74) *Attorney, Agent, or Firm* — McClure, Qualey & Rodack, LLP

(57) ABSTRACT

A flash memory control technique with high reliability is provided. A flash memory controller provides a volatile storage area for temporary storage of logical-to-physical address mapping data between a host and a flash memory as well as error detection codes encoded from the logical-to-physical address mapping data. When reading from the volatile storage area, the microcontroller of the flash memory controller is configured to perform an error detection procedure based on the error detection codes. The microcontroller is further configured to restore the logical-to-physical address mapping data in the volatile storage area based on a backup of the logical-to-physical address mapping data.

12 Claims, 4 Drawing Sheets

(52) U.S. Cl.
CPC .. *G06F 2201/84* (2013.01); *G06F 2212/1008* (2013.01); *G06F 2212/7201* (2013.01); *G06F 2212/7207* (2013.01); *G06F 2212/7209* (2013.01)

(56) References Cited

U.S. PATENT DOCUMENTS

| | | | | |
|---|---|---|---|---|
| 8,429,135 | B1* | 4/2013 | Lang | G06F 12/1027 707/687 |
| 8,914,700 | B2 | 12/2014 | Cheng et al. | |
| 9,063,888 | B2 | 6/2015 | Liang | |
| 9,170,938 | B1* | 10/2015 | Walsh | G06F 12/0246 |
| 9,251,067 | B1* | 2/2016 | Tomlin | G06F 12/0284 |
| 9,465,538 | B2* | 10/2016 | Lai | G06F 3/06 |
| 9,489,296 | B1* | 11/2016 | Tomlin | G06F 12/0246 |
| 2003/0165076 | A1* | 9/2003 | Gorobets | G06F 3/0613 365/200 |
| 2006/0053246 | A1* | 3/2006 | Lee | G06F 9/4403 711/100 |
| 2009/0024899 | A1* | 1/2009 | Reid | H03M 13/09 714/758 |
| 2009/0164702 | A1* | 6/2009 | Kern | G06F 12/0246 711/103 |
| 2009/0172466 | A1* | 7/2009 | Royer | G06F 11/1064 714/6.12 |
| 2009/0248961 | A1* | 10/2009 | Chu | G06F 11/1068 711/103 |
| 2009/0259919 | A1* | 10/2009 | Kilzer | G06F 11/1068 714/773 |
| 2009/0313453 | A1* | 12/2009 | Stefanus | G06F 11/1441 711/210 |
| 2010/0162055 | A1* | 6/2010 | Morita | G06F 11/073 714/704 |
| 2010/0318879 | A1* | 12/2010 | Yu | G06F 11/1004 714/758 |
| 2011/0131365 | A1* | 6/2011 | Zhang | G06F 11/1441 711/103 |
| 2011/0219259 | A1* | 9/2011 | Frost | G06F 11/07 714/6.2 |
| 2012/0066568 | A1* | 3/2012 | Komagome | G06F 11/1016 714/764 |
| 2012/0144103 | A1* | 6/2012 | Ko | G11C 7/1075 711/104 |
| 2012/0290895 | A1* | 11/2012 | Jee | G06F 11/1068 714/758 |
| 2013/0159815 | A1* | 6/2013 | Jung | G06F 11/10 714/773 |
| 2014/0047300 | A1 | 2/2014 | Liang et al. | |
| 2014/0101369 | A1 | 4/2014 | Tomlin et al. | |
| 2014/0258588 | A1* | 9/2014 | Tomlin | G06F 12/0246 711/103 |
| 2014/0281148 | A1* | 9/2014 | Ichida | G06F 12/0246 711/103 |
| 2014/0362636 | A1* | 12/2014 | Erickson | G11C 5/005 365/149 |
| 2015/0100847 | A1* | 4/2015 | Ojalvo | G06F 11/1068 714/764 |
| 2015/0324283 | A1* | 11/2015 | Lai | G06F 3/06 714/764 |

FOREIGN PATENT DOCUMENTS

| | | |
|---|---|---|
| TW | 201248404 | 12/2012 |
| TW | 201407628 | 2/2014 |

OTHER PUBLICATIONS

"Error Correction Code in SoC FPGA-Based Memory Systems;" Altera Corporation; Apr. 2012; pp. 1-10.

Chinese language office action dated Aug. 8, 2016, issued in application No. CN 201410218979.X.

\* cited by examiner

FLASH MEMORY CONTROLLER, DATA STORAGE DEVICE, AND FLASH MEMORY CONTROL METHOD WITH VOLATILE STORAGE RESTORATION

CROSS REFERENCE TO RELATED APPLICATIONS

This Application claims priority of Taiwan Patent Application No. 103114630, filed on Apr. 23, 2014, the entirety of which is incorporated by reference herein.

BACKGROUND OF THE INVENTION

Field of the Invention

The present invention relates to data storage devices with flash memory and flash memory control methods.

Description of the Related Art

Flash memory, e.g., NAND flash, is commonly used as the data storage medium of today's data storage devices.

For example, flash memory is typically used in memory cards, USB flash devices, solid-state drives, and so on. In another application with multi-chip package technology, a NAND flash chip and a controller chip are combined in one package as an embedded multimedia card (e.g. an eMMC).

The physical storage space of a flash memory is divided into blocks, and each block includes a plurality of pages. An erase operation designed to reuse the storage space of the flash memory is performed on a block-by-block basis, to release space one block at a time. When updating data, the new data is written into a spare space and the space storing the old data is labeled "invalid." In comparison with other types of data storage mediums, it is more complex to manage a flash memory. A specially designed controller for flash memory, therefore, is required.

The shrinking size of semiconductor devices may threaten the reliability of a flash memory. Especially, cosmic particle impacts (e.g. neutron strikes) may cause a certain degree of damage to the highly sophisticated semiconductor device. The data in the storage space hit by cosmic particles may be damaged.

BRIEF SUMMARY OF THE INVENTION

A high-reliability flash memory control technology is shown.

A flash memory controller in accordance with an exemplary embodiment uses a volatile storage area to store logical-to-physical address mapping data between a host and a flash memory. A microcontroller of the flash memory controller is configured to further store error detection codes into the volatile storage area for the logical-to-physical address mapping data. When reading from the volatile storage area, the microcontroller is configured to perform an error detection procedure based on the error detection codes. When the error detection procedure shows that the logical-to-physical address mapping data retrieved from the volatile storage area is incorrect, the microcontroller is configured to restore the logical-to-physical address mapping data in the volatile storage area based on a backup of the logical-to-physical address mapping data.

In another exemplary embodiment, the flash memory controller and the flash memory are combined together to form a data storage device.

In another exemplary embodiment, a flash memory control method is disclosed, including the following steps: providing a volatile storage area to store logical-to-physical address mapping data between a host and a flash memory as well as error detection codes encoded from the logical-to-physical address mapping data; performing an error detection procedure based on the error detection codes when reading from the volatile storage area; and, when the error detection procedure shows that the logical-to-physical address mapping data retrieved from the volatile storage area is incorrect, restoring the logical-to-physical address mapping data in the volatile storage area based on a backup of the logical-to-physical address mapping data.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
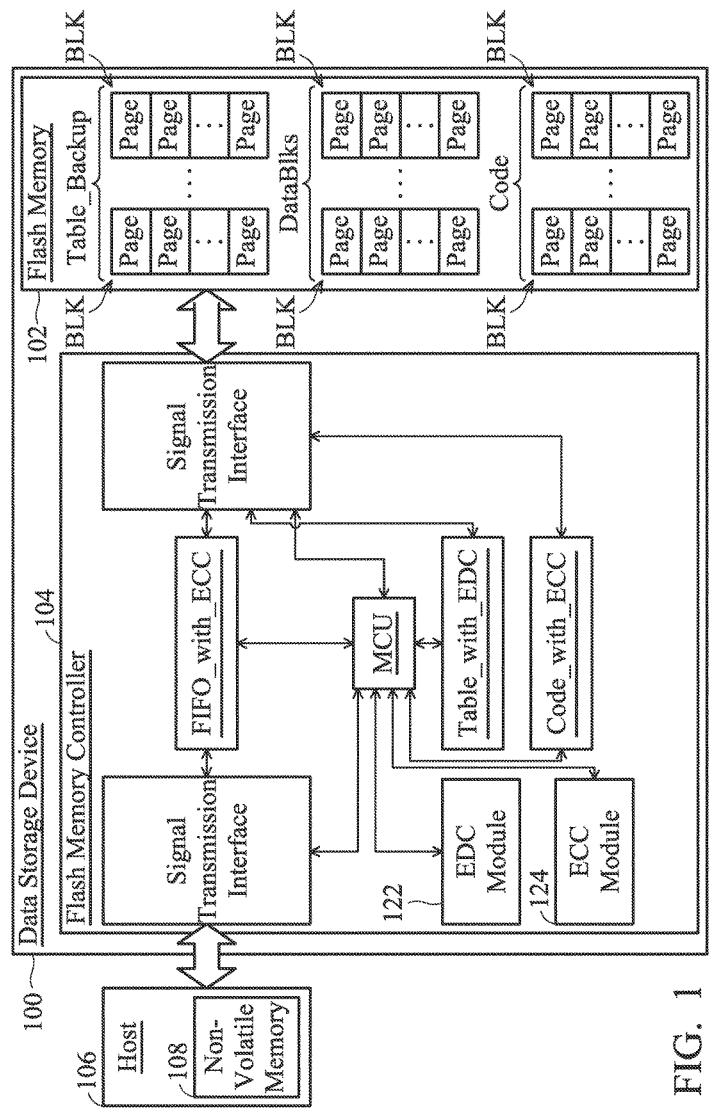
FIG. 1 depicts a data storage device 100 in accordance with an exemplary embodiment of the disclosure, which includes a flash memory controller 104.

FIG. 1 depicts a data storage device 100 in accordance with an exemplary embodiment of the disclosure. The data storage device 100 includes a flash memory 102 and a flash memory controller 104. The flash memory controller 104 operates the flash memory 102 in accordance with commands issued from a host 106.

The storage space of the flash memory 102 is divided into a plurality of blocks (labeled as 'BLK'). Each block BLK is further divided into a plurality of pages. A logical-to-physical address mapping table has to be established to show the mapping relationship between logical addresses at the host side and the physical addresses at the flash memory 102 side. Some of the blocks of the flash memory 102 are allocated for user data storage and are labeled as DataBlks. Furthermore, a backup of the data of the logical-to-physical address mapping table and a firmware code are stored in the flash memory 102 and labeled as Table_Backup and Code, respectively. In an exemplary embodiment of the disclosure the firmware code Code includes the booting code to be executed in response to a booting procedure of the host 106.

Referring to the architecture of the flash memory controller 104 of FIG. 1, the flash memory controller 104 administers communication between the host 106 and the flash memory 102 through the signal transmission interfaces at the two sides. The flash memory controller 104 includes a microcontroller MCU, an error detection module (e.g. an EDC module) 122, an error checking and correction module (e.g. an ECC module) 124 and volatile storage areas Table_with_EDC, FIFO_with_ECC and Code_with_ECC. The error detection module 122 under the control of the microcontroller MCU is provided to perform an error detection procedure on the data transmitted between the two signal transmission interfaces and error detection codes for the transmitted data may be generated by the error detection module 122. Similarly, the error checking and correction module 124 under the control of the microcontroller MCU is provided to perform an error checking and correction procedure on the data transmitted between the two signal transmission interfaces and error checking and correction codes for the transmitted data may be generated by the error checking and correction module 124. The microcontroller MCU is configured to use the volatile storage area Table_with_EDC to temporarily store the logical-to-physical address mapping data between the host 106 and the flash memory 102 as well as the error detection codes encoded from the logical-to-physical address mapping data. In an exemplary embodiment, the error detection module 122 performs checksum calculations based on the error detection codes to determine whether the mapping data retrieved from the volatile storage area Table_with_EDC is correct. The volatile storage area FIFO_with_ECC is allocated for data buffering between the host 106 and the flash memory 102 and is further used to store the error checking and correction codes encoded from the buffered data. The volatile storage area Code_with_ECC is allocated for temporary storage of the firmware code Code of the flash memory 102 and is further used to store the error checking and correction codes encoded from the downloaded firmware code.

In an exemplary embodiment, the flash memory controller 104 is equipped with a static random access memory (SRAM) to be allocated to provide the aforementioned volatile storage areas Table_with_EDC, FIFO_with_ECC and Code_with_ECC.

The reliability of the flash memory controller 104 is considerably improved by the allocation of the aforementioned volatile storage areas Table_with_EDC, FIFO_with_ECC and Code_with_ECC.

As for the volatile storage areas FIFO_with_ECC and Code_with_ECC managed according to an error checking and correction technology, data errors may be detected and corrected based on the accompanying error checking and correction codes. In an exemplary embodiment, the error checking and correction codes encoded from the data temporarily stored in the volatile storage areas FIFO_with_ECC and Code_with_ECC may provide an error correction capability to correct 1-bit error per 512 bytes.

Note that the volatile storage area Table_with_EDC is only stored with error detection codes (e.g., for checksum calculations with low computational cost) because of the huge data quantity of a logical-to-physical address mapping table. In an exemplary embodiment, every 512 bytes of mapping data is stored into the volatile storage area Table_with_EDC with one error detection bit.

As previously mentioned, the volatile storage area Table_with_EDC may be allocated for temporary storage of logical-to-physical address mapping data and may be further stored with error detection codes encoded from the logical-to-physical mapping data. When reading from the volatile storage area Table_with_EDC, the microcontroller MCU is configured to perform an error detection procedure based on the error detection codes to determine whether the logical-to-physical address mapping data retrieved from the volatile storage area Table_with_EDC is correct. When the logical-to-physical address mapping data retrieved from the volatile storage area Table_with_EDC is incorrect, the microcontroller MCU is configured to restore the logical-to-physical address mapping data in the volatile storage area Table_with_EDC based on the backup Table_Backup of the logical-to-physical address mapping data. The backup Table_Backup may be prepared in a non-volatile memory, such as the flash memory 102 or a non-volatile memory at the host 106 side.

In conventional techniques, a flash memory controller does not introduce any error detection or ecc function to the volatile memory contained therein. Thus, it is unable to correct data errors in the volatile memory of the conventional flash memory controller. However, according to the disclosure, data error (e.g., data damaged by any unexpected event—like "cosmic particle impact") in the volatile storage areas Table_with_EDC, FIFO_with_ECC and Code_with_ECC is detectable or even correctable by the microcontroller MCU.

In an exemplary embodiment of the disclosure, a backup procedure for the logical-to-physical address mapping table between the host 106 and the flash memory 102 is routinely repeated in a constant cycle time, T. The cycle time, T, depends on the semiconductor processing conditions of the volatile storage areas Table_with_EDC, FIFO_with_ECC and Code_with_ECC. A possible number of bit transitions, due to cosmic particle impact, during the constant cycle time T on each section of data managed by each error detection code should not exceed the error detection capability of the error detection code. For example, when checksum calculation is performed, only one bit transition due to cosmic particle impact is allowed during one cycle time T on each error-detected section of data managed by each error detection code. The length of the cycle time, T, is an average experimental value.

Furthermore, the timing of the error detection and data restoration of the volatile storage areas Table_with_EDC, FIFO_with_ECC and Code_with_ECC is discussed in this paragraph. In the following, the volatile storage area Table_with_EDC is discussed as an example. Error detection and data restoration may be performed on the volatile storage area Table_with_EDC when reading or writing the volatile storage area Table_with_EDC. For example, when the host 106 requests to read the data blocks DataBlks of the flash memory 102, the microcontroller MCU has to read the volatile storage area Table_with_EDC for the logical-to-physical address mapping data and it is a good time for the microcontroller MCU to perform error detection and data restoration on the volatile storage area Table_with_EDC. The microcontroller MCU may further perform error detection and data restoration on the volatile storage area Table_with_EDC when the volatile storage area Table_with_EDC is read for making a backup (e.g. at the flash memory 102 side as the backup Table_Backup or at the host 106 side in the non-volatile memory 108) about the logical-to-physical address mapping table data. Thus, an accurate backup is ensured. Furthermore, before updating the volatile storage area Table_with_EDC, the microcontroller MCU may be further configured to perform the error detection procedure, based on the corresponding error detection codes, on the logical-to-physical address mapping data that is expected to be written into the volatile storage area Table_with_EDC. The other volatile storage areas FIFO_with_ECC and Code_with_ECC may be error checked and corrected at similar time points.

Figure 2:
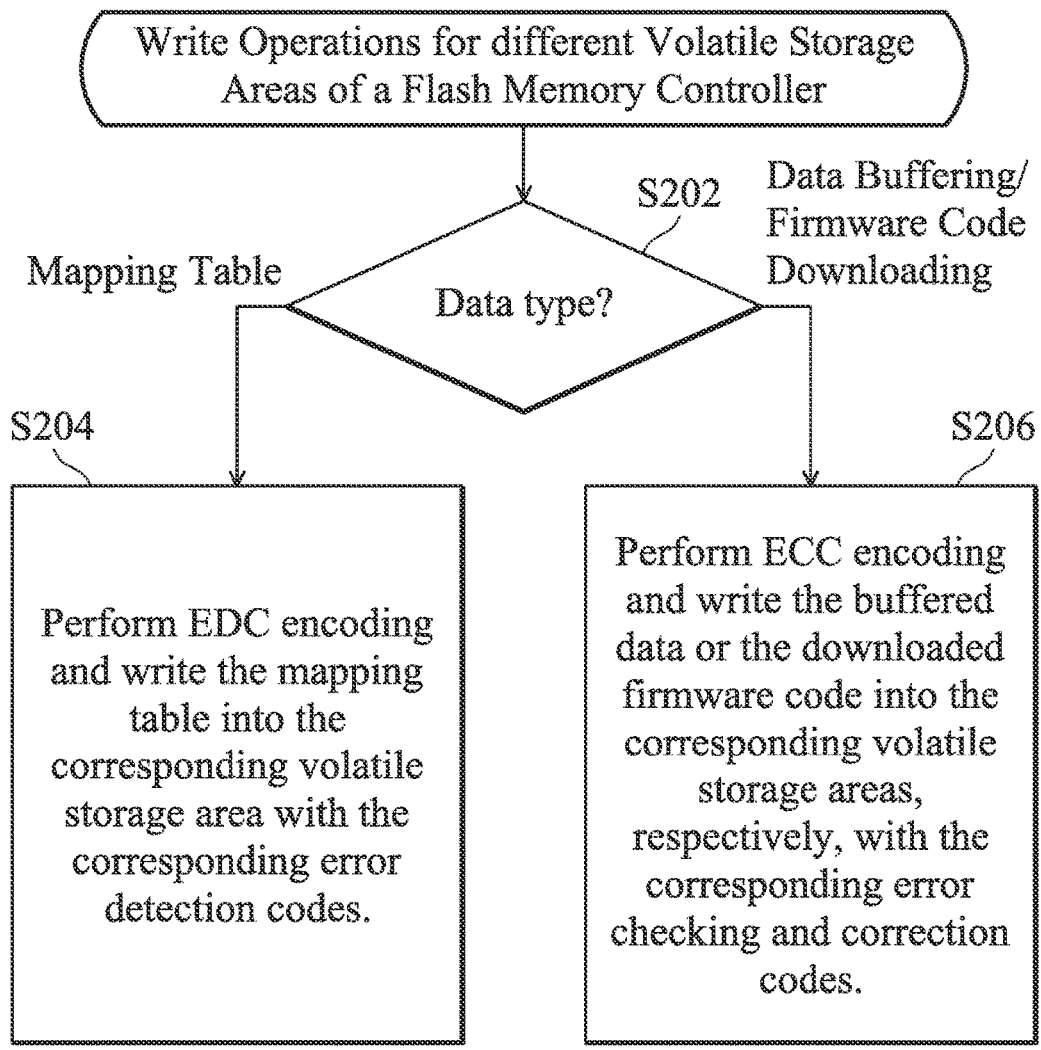
FIG. 2 is a flowchart depicting write operations for the different volatile storage areas of a flash memory controller in accordance with an exemplary embodiment of the disclosure.

FIG. 2 is a flowchart depicting write operations for the different volatile storage areas of a flash memory controller in accordance with an exemplary embodiment of the disclosure. In step S202, the data type is checked. Step S204 is performed for logical-to-physical address mapping data. In step S204, error detection code encoding is performed to generate error detection codes. The error detection codes are encoded from the logical-to-physical address mapping data. The write operation is also performed to write the logical-to-physical address mapping data into the volatile storage area Table_with_EDC of FIG. 1 with the generated error detection codes. Step S206 is performed for data buffering between the host 106 and the flash memory 102 or for the firmware code downloaded from the flash memory 102. In step S206, error checking and correction code encoding is performed and the generated error checking and correction codes are written into the volatile storage area FIFO_with_ECC or Code_with_ECC of FIG. 1 with the buffered data or the downloaded firmware code.

Figure 3:
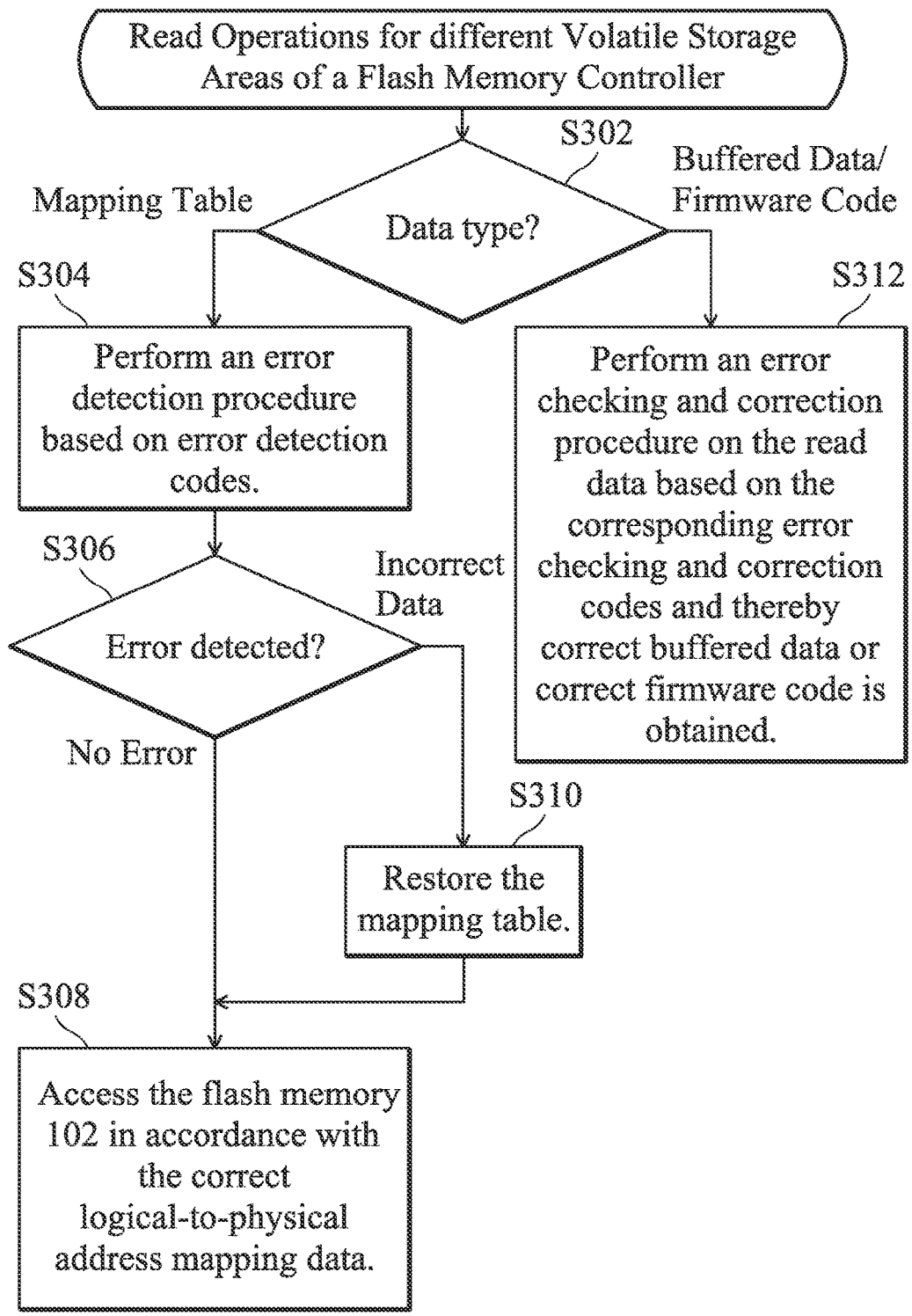
FIG. 3 is a flowchart depicting read operations for the different volatile storage areas of a flash memory controller in accordance with an exemplary embodiment of the disclosure.

FIG. 3 is a flowchart depicting read operations for the different volatile storage areas of a flash memory controller in accordance with an exemplary embodiment of the disclosure. In step S302, the data type is checked. Step S304 is performed for logical-to-physical address mapping data. In step S304, an error detection procedure is performed on the read data based on the corresponding error detection codes. When it is determined in step S306 that the retrieved logical-to-physical address mapping data is correct, step S308 is performed to access the flash memory 102 in accordance with the correct logical-to-physical address mapping data. When it is determined in step S306 that the retrieved logical-to-physical address mapping data is incorrect, step S310 is performed to restore the logical-to-physical address mapping data. After step S310, step S308 is performed to access the flash memory 102 in accordance with the corrected logical-to-physical address mapping data. Furthermore, step S312 is designed to read the volatile storage areas of the flash memory controller for the buffered data or the downloaded firmware code. In step S312, an error checking and correction procedure is performed on the read data based on the corresponding error checking and correction codes and thereby correct buffered data or correct firmware code is obtained.

Figure 4:
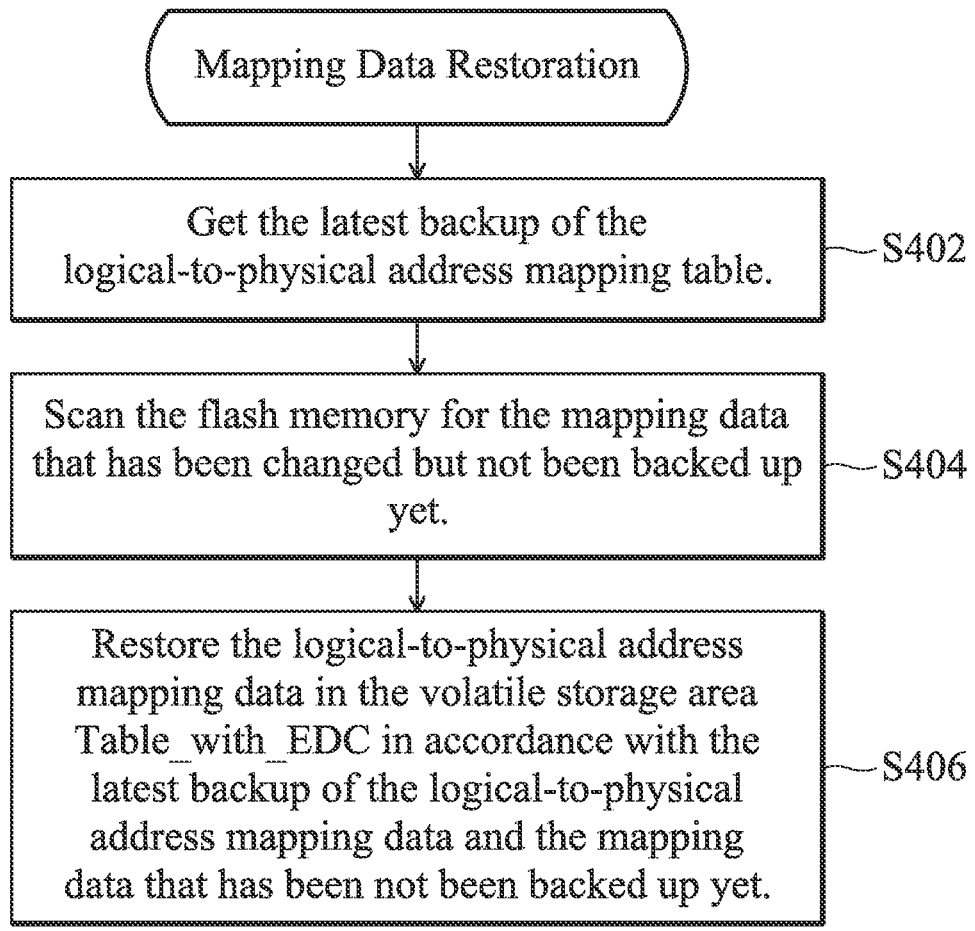
FIG. 4 is a flowchart depicting the restoration of a mapping table temporarily stored in a volatile memory of a flash memory controller.

FIG. 4 is a flowchart depicting the data restoration of the logical-to-physical address mapping data temporarily stored in the volatile storage area Table_with_EDC of the flash memory controller 104 in accordance with an exemplary embodiment of the disclosure. In step S402, the latest backup of the logical-to-physical address mapping data is read from the backup Table_Backup of the flash memory 102 or from the non-volatile memory 108 of the host 106. In step S404, the flash memory 102 is scanned for the mapping data that has been changed but not backed up yet. In step S406, the logical-to-physical address mapping data temporarily stored in the volatile storage area Table_with_EDC is restored in accordance with the latest backup (retrieved in step S402) about the logical-to-physical address mapping data and the mapping data (retrieved in step S404) that is contained in the flash memory 102 but has not backed up yet.

In an exemplary embodiment, the aforementioned technical steps may be programmed as a firmware code to be burned into the flash memory controller. In another exemplary embodiment, the firmware code is loaded into the flash memory controller during a power-on process of the data storage device using the flash memory controller, to be executed by the microcontroller of the flash memory controller. Any technique using the aforementioned concept to control a flash memory is within the scope of the invention. In an exemplary embodiment, a flash memory control method is shown, which is not limited to any specific controller architecture.

While the invention has been described by way of example and in terms of the embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flash memory controller, operating a flash memory in accordance with commands issued from a host, comprising:
    a first volatile storage area, storing logical-to-physical address mapping data between the host and the flash memory as well as error detection codes encoded from the logical-to-physical address mapping data;
    a second volatile storage area, storing firmware code downloaded from the flash memory and error checking and correction codes encoded from the firmware code read from the flash memory, wherein the error checking and correction codes encoded from the firmware code are generated in response to write operations that write the firmware code downloaded from the flash memory into the second volatile storage area; and
    a microcontroller, configured to perform an error detection procedure based on the error detection codes when reading from the first volatile storage area, and configured to perform an error checking and correction procedure based on the error checking and detection codes when reading from the second volatile storage area,
    wherein when the error detection procedure shows that logical-to-physical address mapping data retrieved from the first volatile storage area is incorrect, the microcontroller is configured to restore the logical-to-physical address mapping data in the first volatile storage area based on a backup of the logical-to-physical address mapping data.

2. The flash memory controller as claimed in claim 1, wherein:
    the microcontroller is configured to update the backup at a constant cycle time;
    the constant cycle time depends on processing conditions of the first volatile storage area; and
    a possible number of bit transitions, due to cosmic particle impact during the constant cycle time on each section of data managed by each error detection code, does not exceed error detection capability of the error detection code.

3. The flash memory controller as claimed in claim 1, wherein the backup is stored in a non-volatile memory of the host.

4. The flash memory controller as claimed in claim 1, wherein:
    before updating the logical-to-physical address mapping data in the first volatile storage area, the microcontroller is further configured to perform the error detection procedure on the logical-to-physical address mapping data expected to be written into the first volatile storage area; and
    the error detection codes are generated by an error detection module.

5. The flash memory controller as claimed in claim 1, further comprising:
a third volatile storage area for data buffering between the host and the flash memory and being stored with error checking and correction codes encoded from buffered data,
wherein:
when reading from the third volatile storage area for the buffered data, the microcontroller is configured to perform an error checking and correction procedure based on the error checking and correction codes encoded from the buffered data; and
the error checking and correction codes encoded from the buffered data are generated by an error checking and correction module specifically for the data buffering.

6. The flash memory controller as claimed in claim 5, further comprising:
a static random access memory, allocated to provide the first, second and third volatile storage areas.

7. A data storage device, comprising the flash memory controller as claimed in claim 1 and the flash memory.

8. A flash memory control method, operating a flash memory in accordance with commands issued from a host, comprising:
providing a first volatile storage area to store logical-to-physical address mapping data between the host and the flash memory and error detection codes encoded from the logical-to-physical address mapping data;
providing a second volatile storage area to store firmware code downloaded from the flash memory and error checking and correction codes encoded from the firmware code read from the flash memory, wherein the error checking and correction codes encoded from the firmware code are generated in response to write operations that write the firmware code downloaded from the flash memory into the second volatile storage area;
when reading from the first volatile storage area, performing an error detection procedure based on the error detection codes;
when the error detection procedure shows that logical-to-physical address mapping data retrieved from the first volatile storage area is incorrect, restoring the logical-to-physical address mapping data in the first volatile storage area based on a backup of the logical-to-physical address mapping data; and
when reading from the second volatile storage area, perform an error checking and correction procedure based on the error checking and detection codes.

9. The flash memory control method as claimed in claim 8, further comprising:
updating the backup at a constant cycle time,
wherein:
the constant cycle time depends on processing conditions of the first volatile storage area; and
a possible number of bit transitions, due to cosmic particle impact during the constant cycle time on each section of data managed by each error detection code, does not exceed error detection capability of the error detection code.

10. The flash memory control method as claimed in claim 8, wherein:
the backup is stored in non-volatile memory of the host.

11. The flash memory control method as claimed in claim 8, further comprising:
before updating the logical-to-physical address mapping data in the first volatile storage area, performing the error detection procedure on the logical-to-physical address mapping data expected to be written into the first volatile storage area,
wherein the error detection codes are generated by an error detection module.

12. The flash memory control method as claimed in claim 8, further comprising:
providing a third volatile storage area for data buffering between the host and the flash memory and further using the third volatile storage area to store error checking and correction codes encoded from buffered data; and
performing an error checking and correction procedure based on the error checking and correction codes encoded from the buffered data when reading from the third volatile storage area,
wherein the error checking and correction codes encoded from the buffered data are generated by an error checking and correction module specifically for the data buffering.

* * * * *